United States Patent
Limbasia et al.

(10) Patent No.: US 9,256,403 B2
(45) Date of Patent: Feb. 9, 2016

(54) UNIFIED FLOW DESIGNER

(71) Applicant: Verizon Patent and Licensing Inc., Basking Ridge, NJ (US)

(72) Inventors: Sunil D. Limbasia, Irving, TX (US); Syam Srinivas Suri, Flower Mound, TX (US); Jacques W. Gresset, Charlotte, NC (US); Abhilash Paul, Irving, TX (US); Wei Wang, The Colony, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 10 days.

(21) Appl. No.: 14/262,898

(22) Filed: Apr. 28, 2014

(65) Prior Publication Data

US 2015/0309771 A1    Oct. 29, 2015

(51) Int. Cl.
*G06F 9/44*    (2006.01)
*G06F 3/0484*    (2013.01)

(52) U.S. Cl.
CPC .. *G06F 8/34* (2013.01); *G06F 8/20* (2013.01); *G06F 3/04842* (2013.01)

(58) Field of Classification Search
CPC ............... G06F 8/30; G06F 8/34; G06F 8/38; G06F 8/35; G06F 8/33; G06F 11/3664; G06F 11/3696; G06F 11/362; G06F 3/0482; G06F 3/04842; G06F 8/20
See application file for complete search history.

(56) References Cited

U.S. PATENT DOCUMENTS

| | | | | |
|---|---|---|---|---|
| 5,966,532 A * | 10/1999 | McDonald | ................ | G60F 8/34 717/113 |
| 6,738,964 B1 * | 5/2004 | Zink | .................... | G06F 17/5045 717/113 |
| 7,370,315 B1 * | 5/2008 | Lovell | ....................... | G06F 8/33 717/113 |
| 7,624,375 B2 * | 11/2009 | Santori | ..................... | G06F 8/38 717/105 |
| 8,627,272 B1 * | 1/2014 | Lin | ........................... | G06F 8/10 717/110 |
| 8,726,233 B1 * | 5/2014 | Raghavan | ........... | G06F 17/5009 717/105 |
| 2004/0230954 A1 * | 11/2004 | Dandoy | ............... | G06F 11/3644 717/124 |
| 2004/0255269 A1 * | 12/2004 | Santori | ..................... | G06F 8/38 717/109 |
| 2006/0129976 A1 * | 6/2006 | Brand | ....................... | G06F 8/10 717/109 |
| 2014/0006991 A1 * | 1/2014 | Kalaidjian | ................ | G06F 8/74 717/105 |

OTHER PUBLICATIONS

Wendy Chisholm et al., HTML Techniques for Web Content Accessibility Guidelines 1.0, W3C, Nov. 2000, pp. 1-47, retrieved online on Oct. 16, 2015. Retrieved from the Internet: <URL: http://www.w3.org/TR/WCAG10-HTML-TECHS/>.*
David Joshua Kurlander, Graphical Editing by Example, Columbia University, Jul. 1993, retrieved online on Oct. 16, 2015, pp. 1-234. Retrieved from the Internet: <URL: http://delivery.acm.org/10.1145/200000/194118/thesis.pdf?>.*

* cited by examiner

*Primary Examiner* — Thuy Dao
*Assistant Examiner* — Hanh T Bui

(57) ABSTRACT

An interface enables a user to select a graphical object to include in a flow. The graphical object is associated with code, and this code may relate to presenting digital content. The interface further allows a user to define a graphical relationship in the flow, such as a connection between the graphical object and another element of the flow. The interface may present the flow in a first area of a display and the digital content in a second area of the display. The code may be executed based on the graphical relationship. For example, the graphical relationship may indicate an order for executing code sections associated with the flow and data exchanged within the code sections.

20 Claims, 13 Drawing Sheets

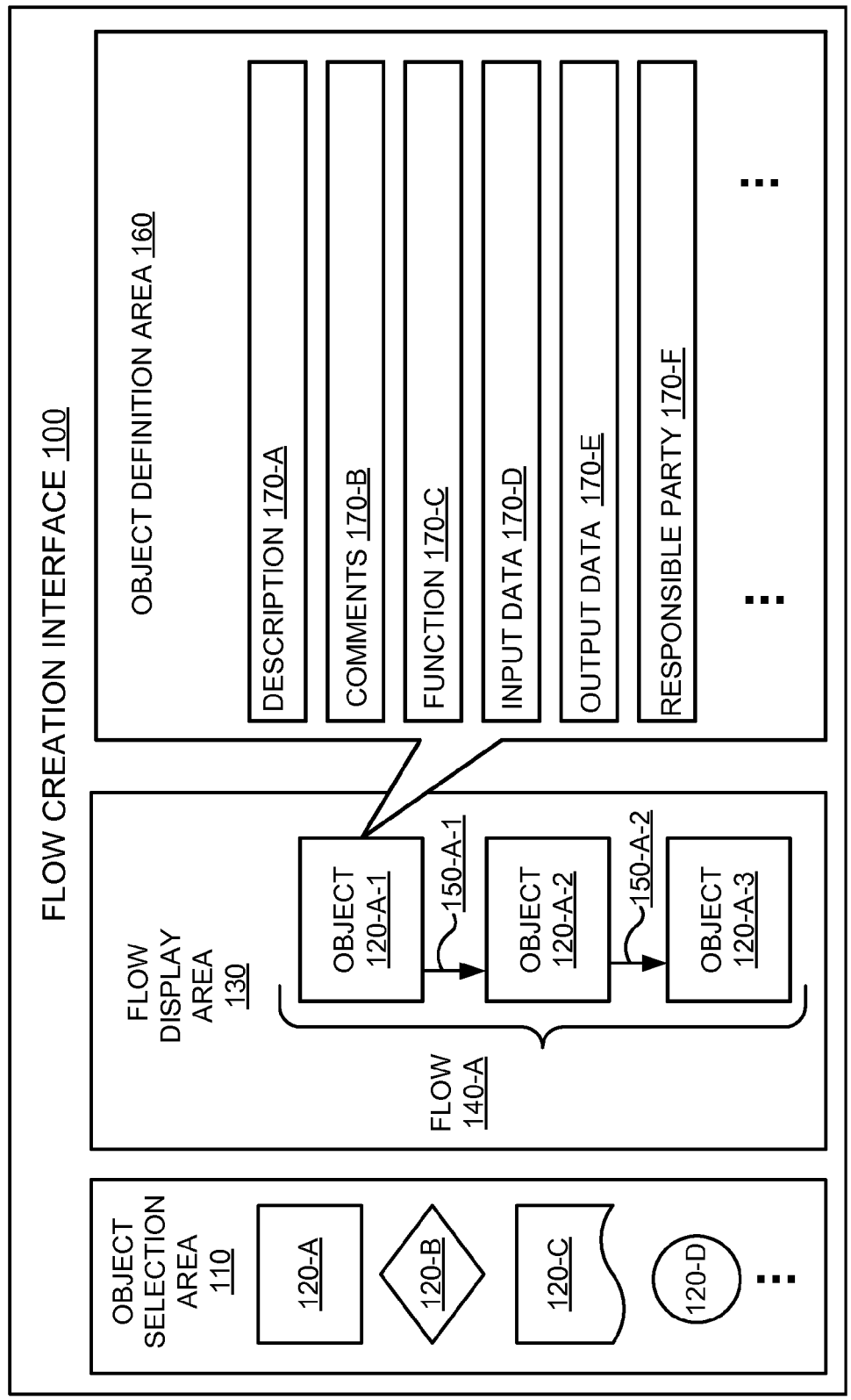

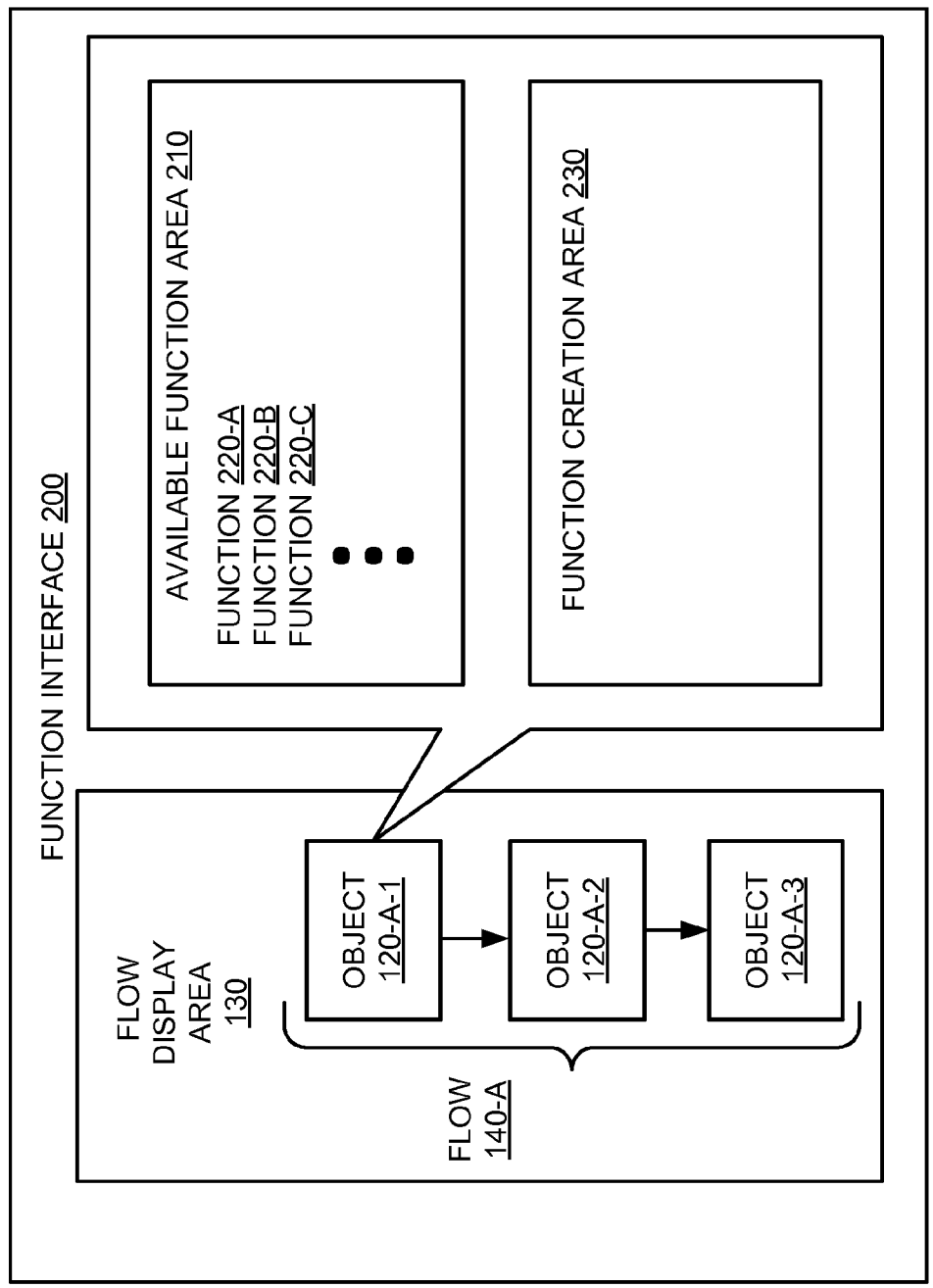

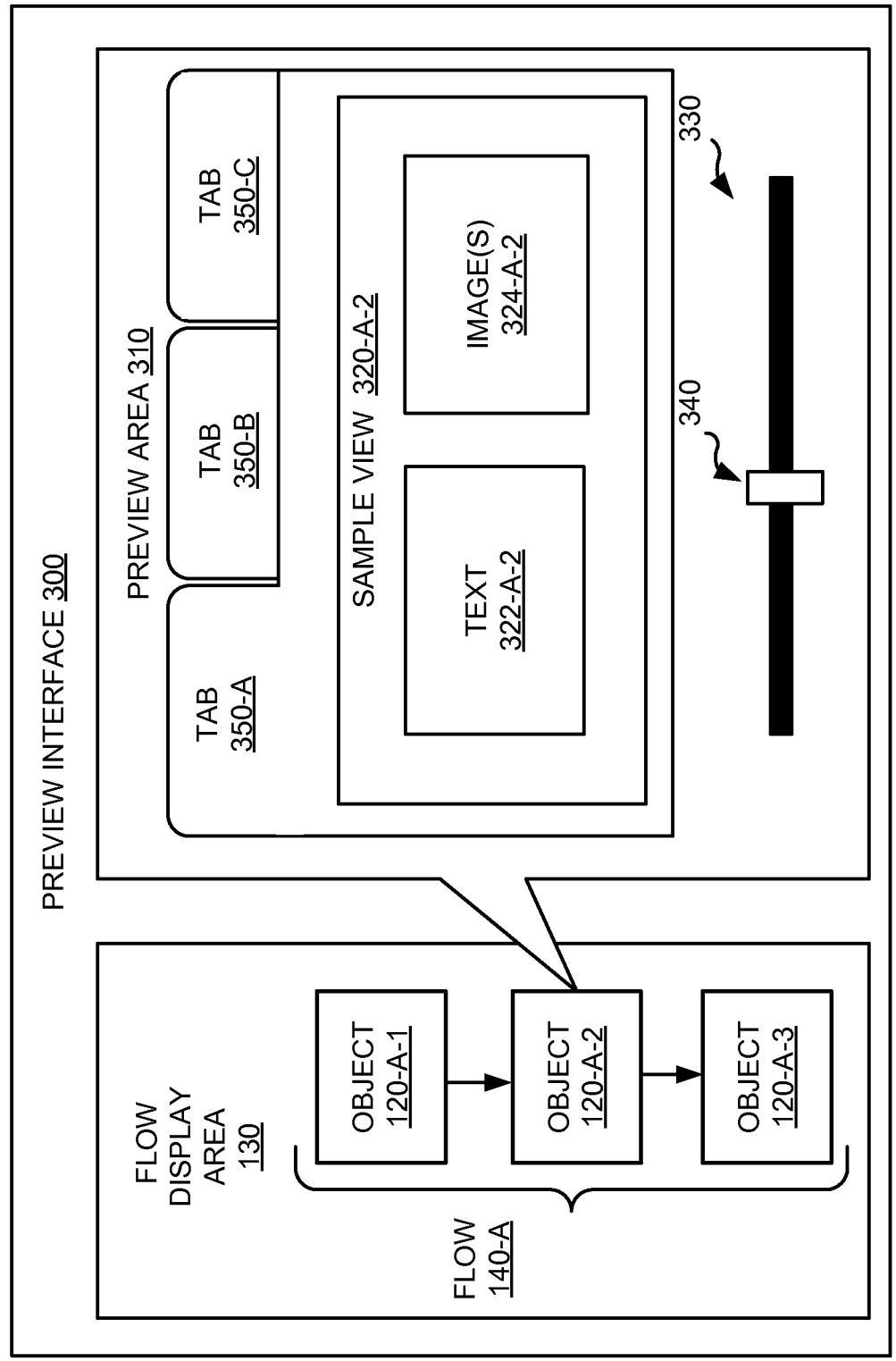

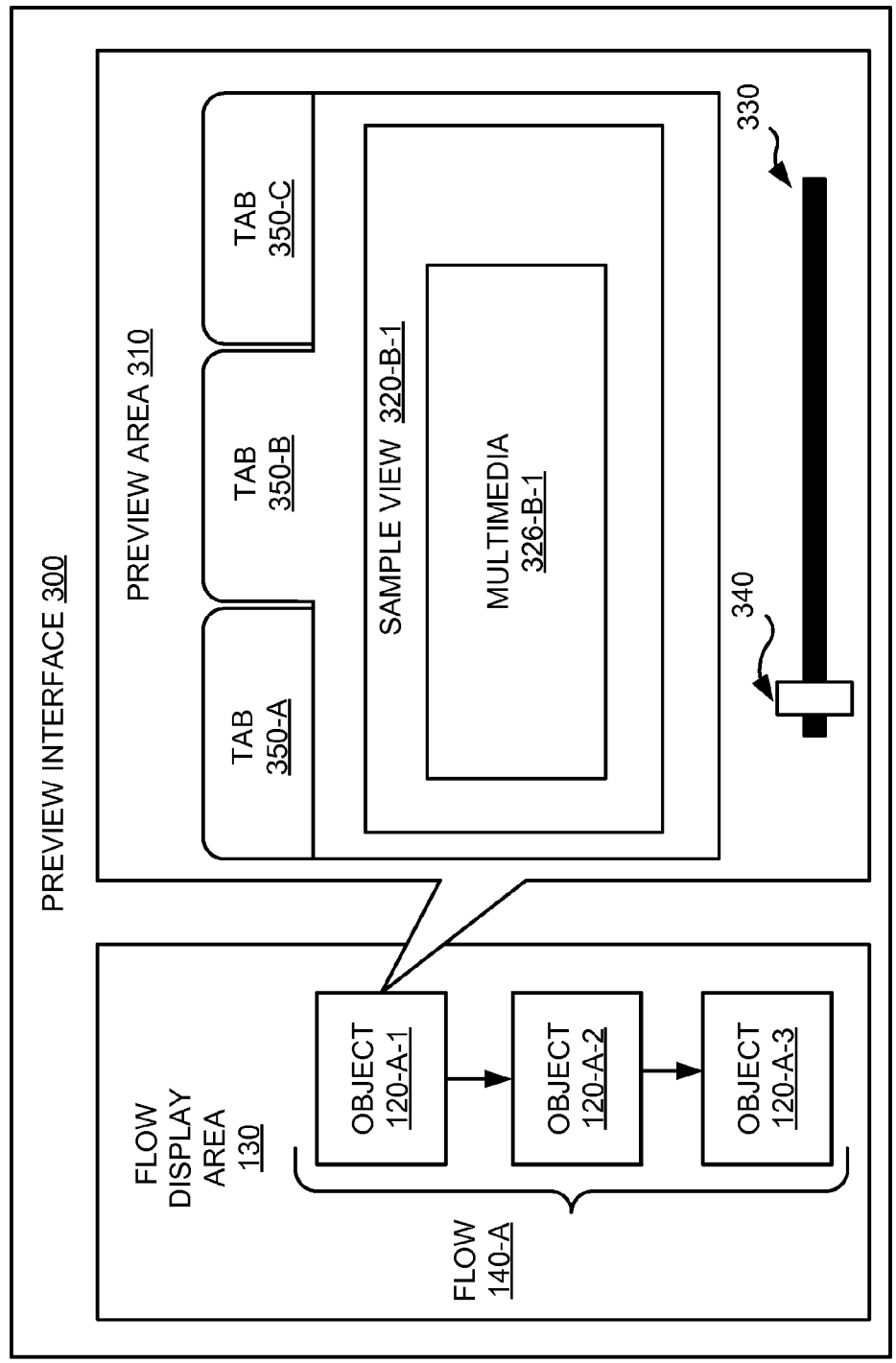

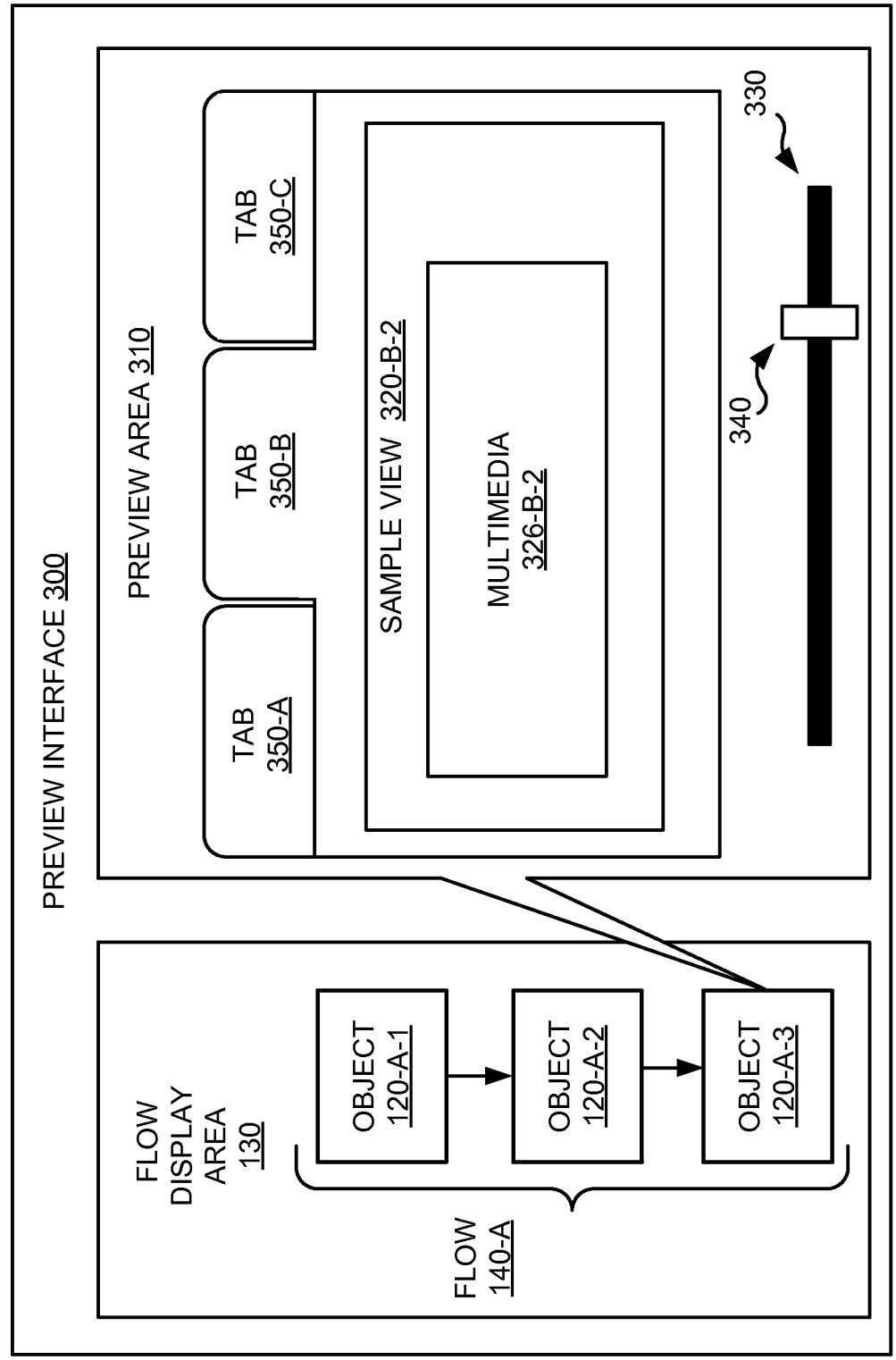

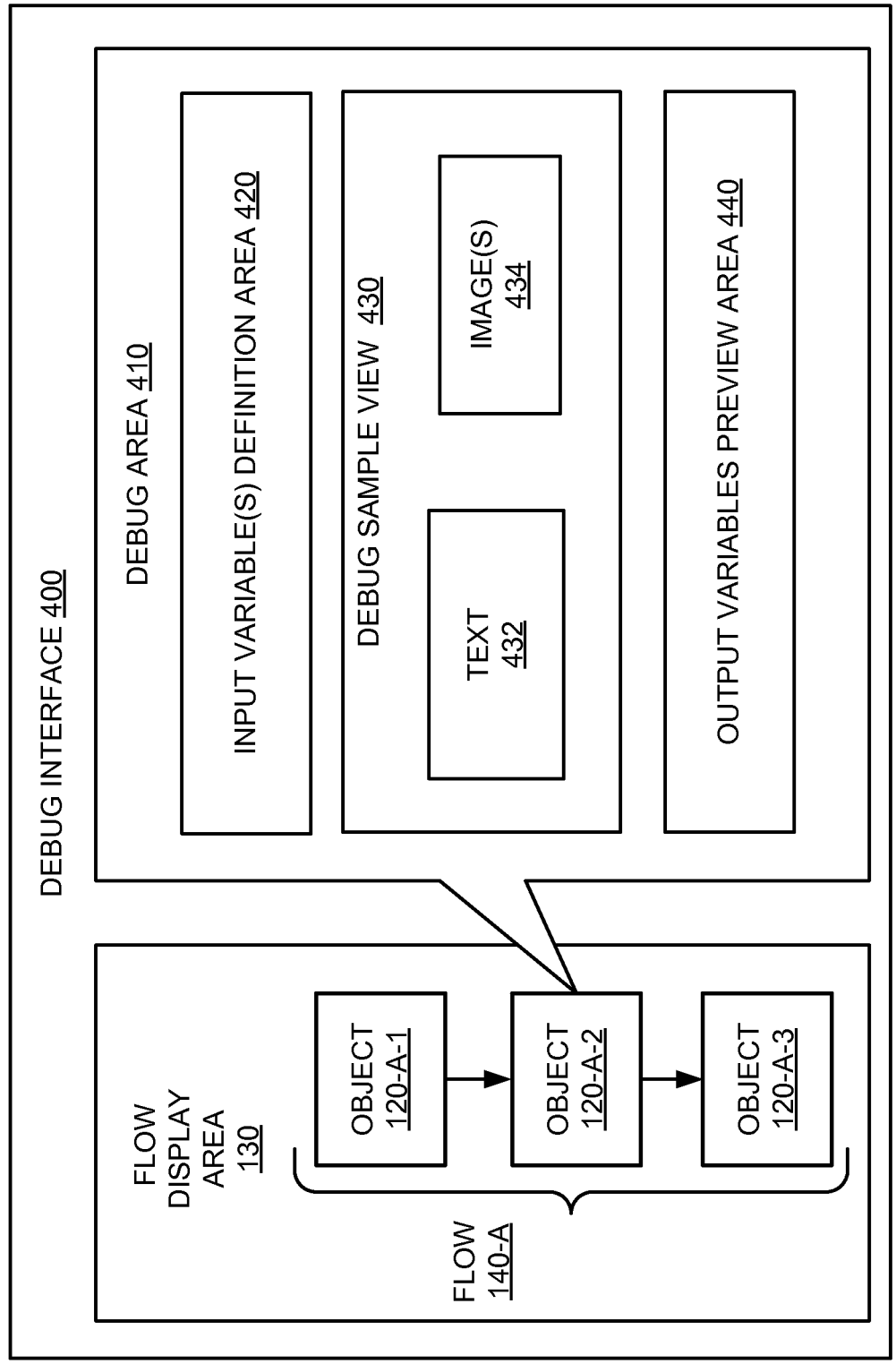

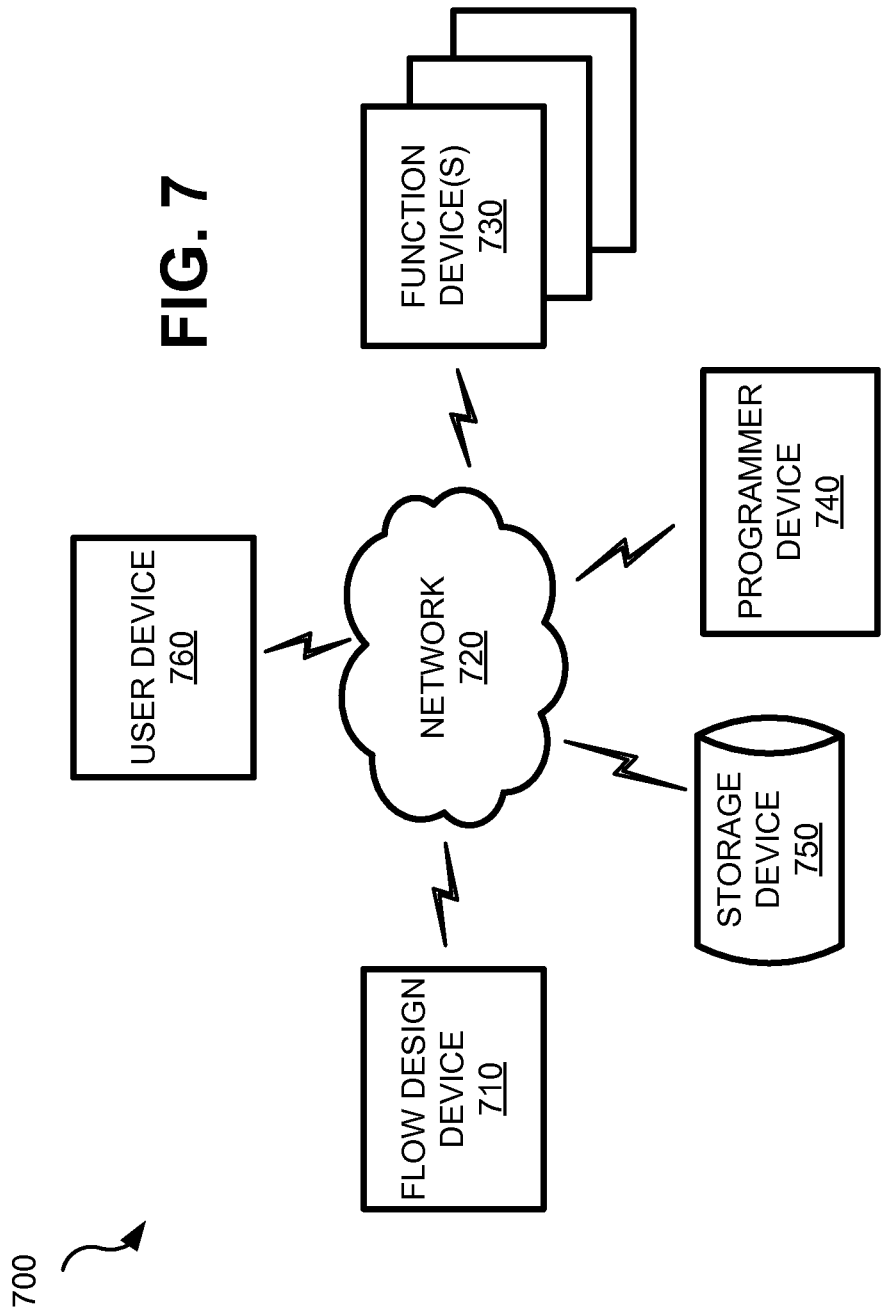

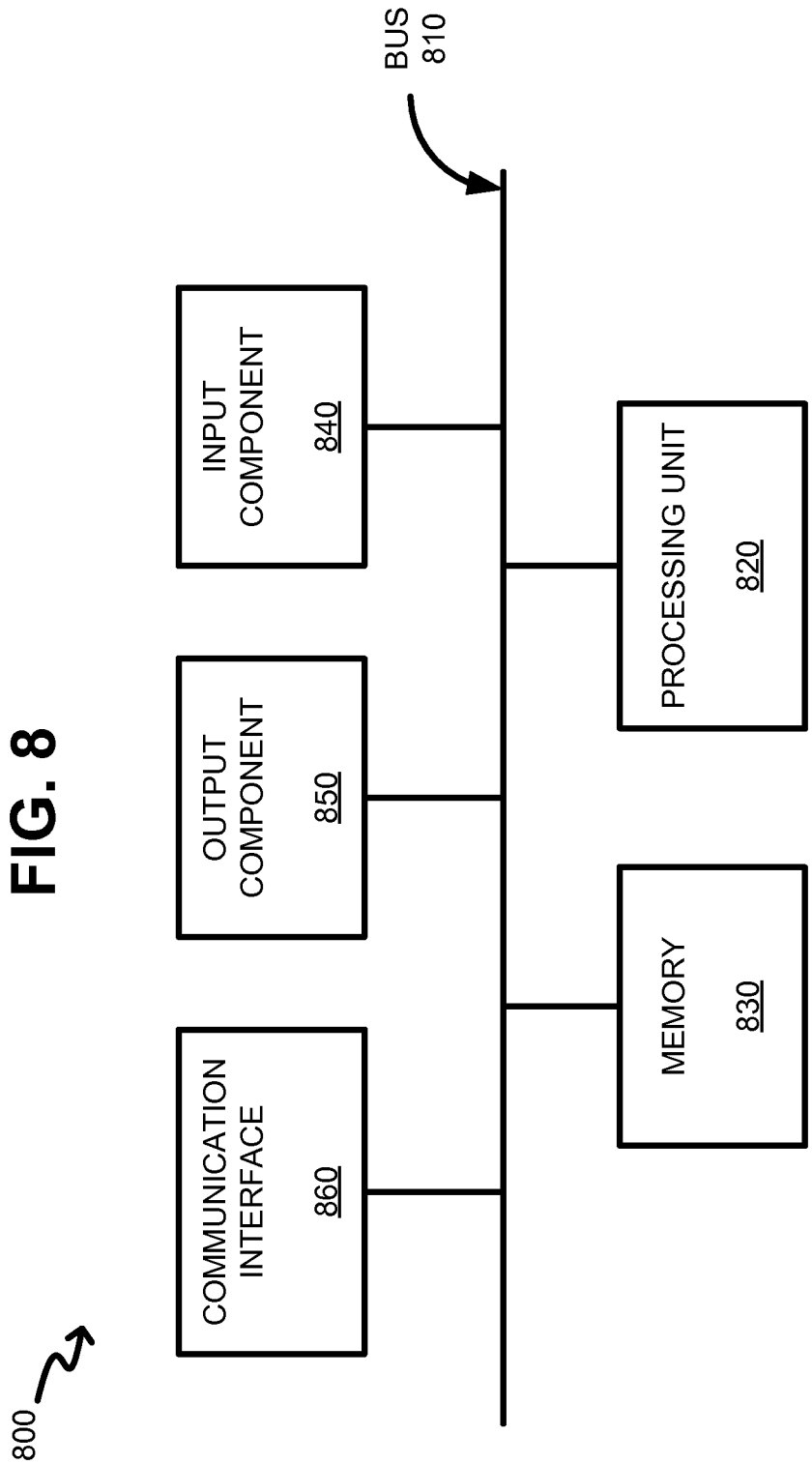

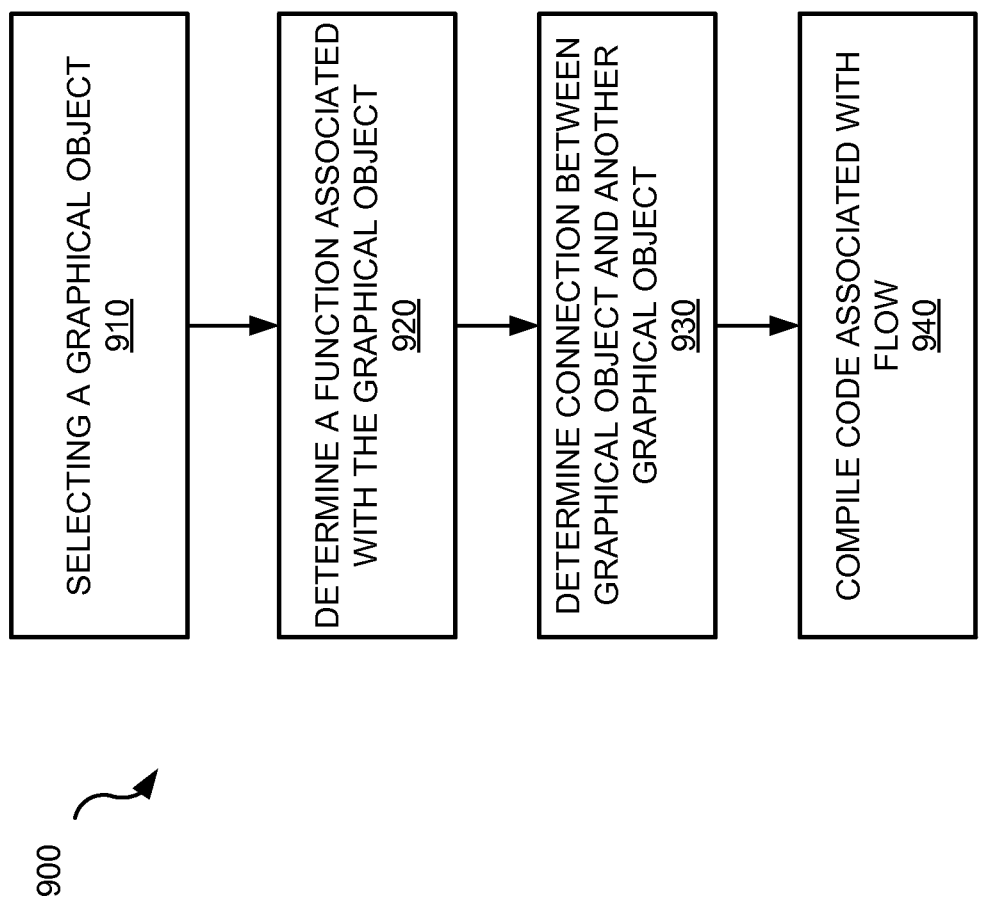

UNIFIED FLOW DESIGNER

BACKGROUND

A flowchart is a type of diagram that may represents an algorithm, workflow or process in a program. The flowchart may show steps in the program as shapes of various kinds and may show an order of the steps by connecting the shapes with arrows. Flowcharts may be used in designing and documenting a program. For example, flowcharts may clarify what is occurring in the program, and flowcharts may help identify flaws, bottlenecks, and other concerns in the program.

BRIEF DESCRIPTION OF THE DRAWINGS

FIG. 1 shows an exemplary interface for generating a flow that includes graphical objects associated with functions;

FIG. 2 shows an exemplary interface for defining functions associated a graphical object included in the flow generated using the interface shown in FIG. 1;

FIGS. 3A-3D show an exemplary interface to provide a preview of the data associated with a graphical object included in the flow generated by the interface shown in FIG. 1;

FIG. 4 shows an exemplary interface for debugging the flow generated using the interface shown in FIG. 1;

FIG. 7 shows exemplary devices that may be included in an environment in which systems and/or methods described herein may be implemented;

FIG. 8 shows a diagram of exemplary components that may be included in a computing device included in the environment shown in FIG. 7; and FIG. 9 shows a flow diagram of an exemplary process for generating a flow in the environment shown in FIG. 7.

DETAILED DESCRIPTION OF PREFERRED EMBODIMENTS

Figure 3A:
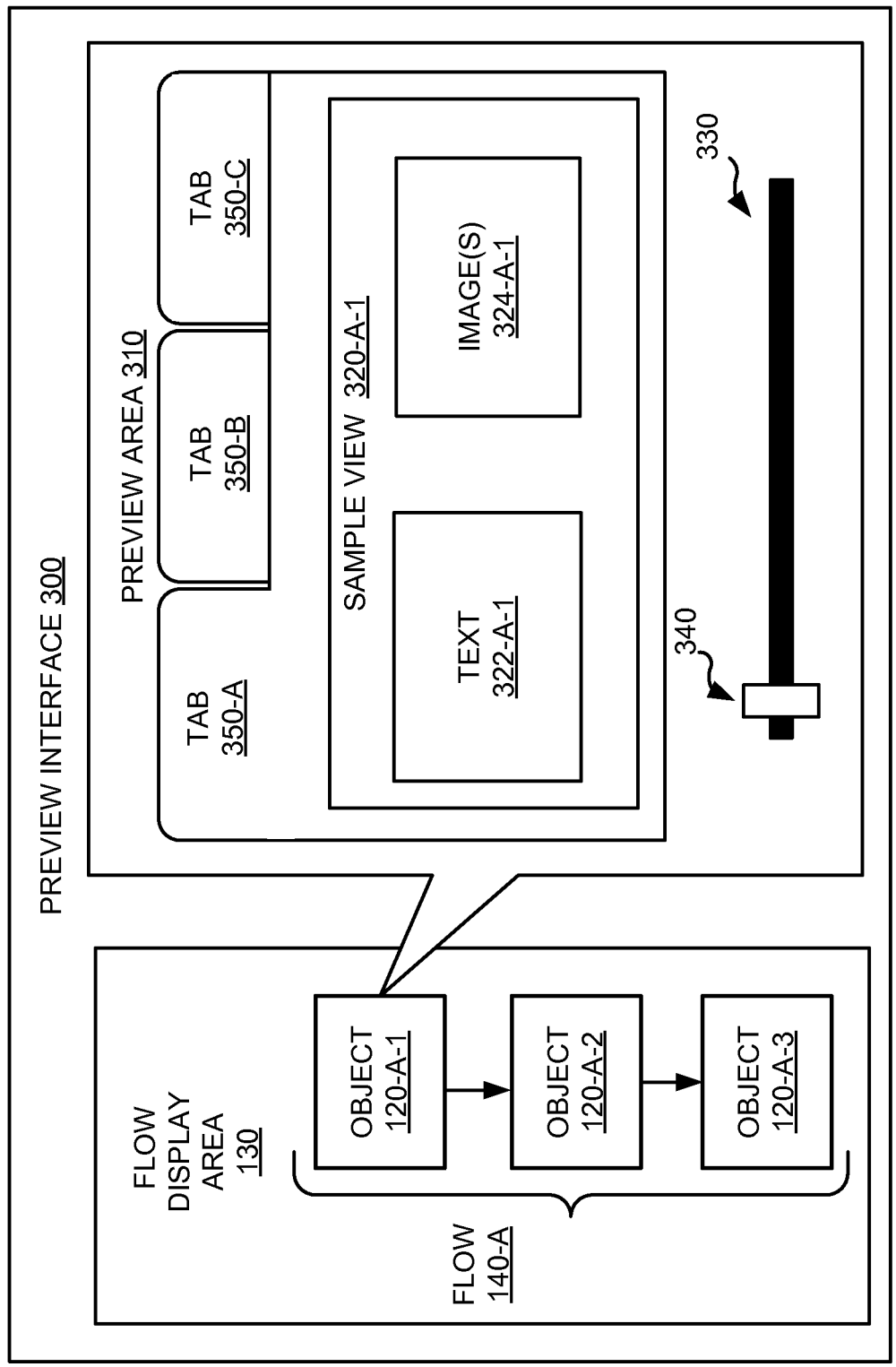

The following detailed description refers to the accompanying drawings. The same reference numbers in different drawings may identify the same or similar elements. Also, the following detailed description does not limit the invention.

Systems and methods described herein relate to providing an interface to receive an input selecting a graphical object to include in a flow. The graphical object is associated with code, and this code may relate to presenting digital content. The interface further allows a user to define a graphical relationship in the flow, such as a connection between the graphical object and another element of the flow. The interface may present the flow in a first area of a display, and may allow the user to preview the digital content in a second area of the display. The code may be compiled or executed based on the graphical relationship. For example, the graphical relationship may indicate an order for executing the code associated with graphical object and code associated with another element of the flow.

As used herein, the term "user" is intended to be broadly interpreted to include a user device or a person using the user device. Also, the terms "user," "consumer," "subscriber," and/or "customer" may be used interchangeably.

FIG. 1 shows an exemplary flow creation interface 100 that may be provided in one implementation. As shown in FIG. 1, flow creation interface 100 may include an object selection area 110 that provides two or more possible graphical objects 120 (shown in FIG. 1 as graphical objects 120-A, 120-B, 120-C, and 120-D) that may be selected by a user for inclusion in a flow 140. Different shaped objects 120 may be associated with different types of operations and/or data. For example, a particular object 120 may be associated with acquiring, processing, and/or presenting particular data.

Continuing with FIG. 1, flow creation interface 100 may further include a flow display area 130 that presents a flow 140 (shown in FIG. 1 as flow 140-A). As used herein, flow 140 may refer to a series of operations represented by selected objects 120 connected by connections 150 (shown in FIG. 1 as connections 150-A-1 and 150-A-2). Although objects 120-A-1 through 120-A-3 shown in FIG. 1 are rectangles, it should be appreciated that flow 140 may include different objects 120 (e.g., objects 120 having different shapes, sizes, colors, etc.). A user may submit an appropriate input to select a particular object 120 in object selection area 110 (e.g., by clicking on the particular object 120 with a mouse or other pointer device), and the particular object 120 may be displayed in flow display area 130. A user may submit an appropriate input to select a particular connection 150 to connect two objects 120 (e.g., by selecting the two objects 120 within flow display area 130), and the particular connection 150 may be displayed in flow display area 130. Connection 150 may further include a visual indication of an order associated with performing operations associated with selected objects 120. Referring to FIG. 1, connection 150-A-1 corresponds to an arrow that connects objects 120-A-1 and 120-A-2 to suggest that an operation associated with object 120-A-1 is performed before an operation associated with object 120-A-2.

In implementations described herein, each of objects 120 may be associated with code for implementing one or more related functions. For example, an object 120 may be associated with Extensible Markup Language (XML) code sections for implementing a related function. XML is a markup language that defines a set of rules for encoding documents in a format that is both human-readable and machine-readable. Many application programming interfaces (APIs) have been developed to aid software developers with processing XML data, and several schema systems exist to aid in the definition of XML-based languages.

The code sections associated with objects 120 included in flow 140 may be compiled and/or executed based on the displayed configuration (e.g., the position of objects 120 and/or connections 150). In the example shown in FIG. 1, code sections associated with objects 120-A-1 and 120-A-2 may be compiled such that output data from object 120-A-1 is provided as input to object 120-A-2. Similarly, a user may add/remove an object 120, manipulate the positions of an object 120, adjust connections 150, etc., to adjust a desired compilation of associated code. In the example shown in FIG. 1, reversing the direction of connection 150-A-1 may cause code sections associated with objects 120-A-1 and 120-A-2 to be compiled such that output data from object 120-A-2 is provided as an input to object 120-A-1.

In certain implementations, objects 120 and connections 150 may be automatically positioned and/or moved within flow display area 130 based on one or more logical rules. For example, objects 120 and/or connections 150 may be may be graphically positioned within flow display area 130 for aesthetic reasons, such as to provide a desired minimum spacing between objects 120 and/or connections 150. In this example, if a new object 120 is added to flow 140, the displayed position of other objects 120 in flow display area 130 may change to minimize overlapping by objects 120 and/or related connections 150. In another example, objects 120 may be graphically positioned within flow display area 130 so that displayed positions of objects 120 in flow display area 130 correspond to an order in which related operations are performed. In this example, if a user graphically positions a first object 120 relative to a second object 120 (e.g., below and/or to the left), an operation associated with first object 120 may be performed before an operation associated with second object 120.

Continuing with FIG. 1, flow creation interface 100 may also include an object definition area 160. Object definition area 160 may include, for example, one or more input fields 170 that enable a user to specify information related to an object 120 (shown as object to 120-A-1) included in flow 140. In the example shown in FIG. 1, object definition area 160 may include description field 170-A to receive information identifying and/or describing an associated object 120 (e.g., text that is displayed with the associated object 120 in flow display area 130); and comments field 170-B to receive comments regarding the associated object 120 (e.g., text that is not displayed with the associated object 120 in flow display area 130). Continuing with the example shown in FIG. 1, object definition area 160 may also include function field 170-C that identifies a function associated with the associated object 120; input data field 170-D that identifies data provided to the associated object 120 (e.g., to be used by the function identified in function field 170-C); and output data field 170-E that identifies data provided by the associated object 120 (e.g., to be outputted by the function identified in function field 170-C). Input data field 170-D and output data field may include, for example, identifiers for the data and/or formatting information. Object definition area 160 may further include a responsible party field 170-F that identifies (e.g., provides contact information) for a person and/or entity associated with the object 120. It should be appreciated, however, that objection definition area 160 may include additional, fewer, and/or different fields 170 than shown in FIG. 1.

In one implementation, different sets of fields 170 may be presented in objection definition area 160 for different objects 120. For example, different sets of fields 170 may be presented in objection definition area 160 based on the functions associated with selected objects 120. For example, if a selected object 120 relates to obtaining data, object definition area 160 may present fields 170 related to identifying the data and a location from which to obtain the data. Conversely, if a selected object 120 relates to presenting data, object definition area 160 may present fields 170 related to specifying a time and a manner for presenting the data.

In one example, a particular flow 140 may relate to providing technical support to a customer, such as to service a set-top box (STB) or other network access equipment located at a customer premises. The technical support may be provided through multiple different data types. For example, the customer may receive technical support through (1) text, images, and/or multimedia content provided through the Internet (e.g., through web pages); (2) automated audio technical support through a series of automated recorded messages that can be accessed through a telephone or network device; (3) live audio technical support (e.g., via telephone) with an individual using a service guide (or menu) to assist the customer; and/or (4) in-person technical support from a technician who acts according to a service manual.

In this example, certain objects 120 may relate to determining the status of a device and determining a mechanism through which the customer is receiving support. Other objects 120 in the particular flow 140 may relate to providing different types of service support to the customer (e.g., through the Internet data, recorded messages, live telephone, or the service manual). For example, one object 120 may relate to providing a recorded multimedia message to the customer, and a second, different, object 120 may relate to providing information to a customer service representative or a technician.

At the same time, the flow designer may separately control the operation of the interfaces in this example by adjusting functions associated with graphical objects 120. For example, if a particular repair is determined to be too difficult and/or dangerous for the customer, functions associated with a particular object 120 for providing information regarding the repair may be modified to output to the service manual accessed by the technician and not to the web pages or recorded voice messages. For example, the flow designer may use flow display area to determine respective sets of different objects 120 associated with each of the interfaces.

Information provided through each of the interfaces may be changed by one of the objects 120 in the particular flow 140, such as to modify the information provided to different functions associated with the interfaces, without having to modify code sections associated with other portions of the particular flow 140. For example, the flow designer may update outputs of the different interfaces to reflect changes to a product or service without needed to entirely recreate flow 140, but still maintaining consistency of technical advice over multiple different customer interfaces represented by objects in the flow 140.

It should be appreciated, however, that flow creation interface 100 in FIG. 1 is provided merely for purpose of simplicity and the illustrated configuration of flow creation interface 100 in FIG. 1 is provided for explanatory purposes only. In practice, flow creation interface 100 may include additional, fewer, or different elements than illustrated in FIG. 1.

FIG. 2 illustrates an exemplary function interface 200 that may be provided in accordance with one implementation. As shown in FIG. 2, function interface 200 may include an available function area 210 that identifies one or more functions 220 (shown in FIG. 2 as functions 220-A, 220-B, and 220-C) that may be associated with an object 120. For example, functions 220 may correspond to functions that are available through one or more legacy systems or application server devices (not shown). Each of functions 220 may correspond to different code sections that may be used when flow 140 is compiled and/or executed, and a user may submit an input to select one of the available functions.

Function interface 200 may graphically identify a selected object 120 (object 120-A-1 in FIG. 2) that is being associated with a function selected through available function area 210 or created through function creation area 230. As shown in FIG. 2, function interface 200 may include a graphical element linking the selected object 120 to available function area 210 and/or function creation area 230.

In one implementation, the list functions 220 presented in available function area 210 may be selected based on a desired operation associated with a corresponding object 120. The different functions 220 identified in available function area 210 may relate to performing a similar operation for different types of data. For example, if a selected object 120 is associated with acquiring data, available function area 210 may display a set of functions 220 related to identifying and acquiring different data. Conversely, if another selected object 120 is associated with processing data, available function area 210 may display a different set of functions 220 related to processing data.

Function interface 200 may be compatible with different user formats that can be imported into flow definitions or functions without converting data. In the previous example of developing a flow for providing customer support through different interfaces, different objects may be associated with functions related to the different user formats.

In one implementation, a list of application programming interfaces (APIs) may be associated with functions 220 identified in available function area 210. For example, selection of a function 220 in available function area 210 may trigger an API with respect to the selected function and the associated object 120. The API may be used, for example, to convert data associated with object 120 to be compatible with selected function. For example, the API may convert a format of the data associated with a particular object 120 (e.g., data input/output from the particular object 120) to be usable by code for the selected function.

Referring to the previous example of providing technical support for an STB, an API may allow a customer service representative access account information to determine if the customer is valid (e.g., authorized to use the STB). The account information may be located on a legacy device that may be difficult to access, for example, through an XML-implemented service menu. Furthermore, the account information from the legacy device may be reformatted by the API for use in the service menu.

Continuing with FIG. 2, function interface 200 may also include a function creation area 230. Function creation area 230 may enable a user to create, locate, and or modify a code sections associated with an object 120. For example, function creation area 230 may include an editor function that enables a user to input code and/or modify code associated with a selected function 220. In another implementation, function creation area 230 may receive input from a first user to define desired code features and may forward this information to a second user (e.g., a programmer) who creates the code. For example, the desired code parameters and features for the code may be forwarded to one or more programmers identified in responsible party field 170-F. A code section formed through creation area 230 may be saved and identified for future selection through available function area 210.

Referring to the previous introduced example of providing technical support for an STB, function creation area may be used to refresh the STB for troubleshooting a problem in the STB.

It should be appreciated, however, that function interface 200 in FIG. 2 is provided merely for purpose of simplicity and the illustrated configuration of function interface 200 in FIG. 2 is provided for explanatory purposes only. In practice, function interface 200 may include additional, fewer, or different elements than illustrated in FIG. 2.

As previously described, an object 120 may be associated a function related to presenting data. FIGS. 3A-3D illustrate an exemplary preview interface 300 to provide a preview of the data presentation that may be provided in accordance with one implementation. Preview interface 300 may include flow display area 130 that presents flow 140 (flow 140-A in FIGS. 3A-3D) and a preview area 310 that presents the preview of a data presentation associated with one of the objects 120 (sample view 320-A-1 in FIG. 3A) included in flow 140. As shown in FIG. 3A, preview area 310 may include a graphical indication (e.g., a graphical symbol) that sample view 320-A-1 is associated with object 120-A-1. In the example shown in FIG. 3A, sample view 320-A-1 corresponds to a document (e.g., a webpage) that includes text 322-A-1 and images 324-A-1.

Preview interface 300 may further include a graphical slider bar 330 and a slider handle 340 that a user may move up or down (for a vertical slider) or left and right (for a horizontal slider) to navigate through different sample views 320. In the example shown in FIG. 3A, preview area 310 may show sample view 320-A-1, corresponding to object 120-A-1, when slider handle 340 is in a corresponding position on slider bar 330. Referring now to FIG. 3B, when slider handle 340 is in a different position on slider bar 330, preview area 310 may show a different sample view 320-A-2. Sample view 320-A-2, corresponding to object 120-A-2, may be a document that includes text 322-A-2 and images 324-A-2. In this way, a user (i.e., the developer of flow 140) may step through the output presentations associated with flow 140 and may quickly navigate to a particular presentation, as desired.

As shown in FIGS. 3A and 3B, preview interface 300 may identity sample views 320 associated with different objects 120. When a particular sample view 320 is presented (e.g., when code associated with flow 140 is being executed), a user may quickly identify a corresponding objects 120 associated with the presented sample view 320. For example, if sample view 320-A-1 is presented to a user, as show in FIG. 3A, the user may determine that code associated with object 120-A-1 is being executed.

As shown in FIGS. 3A-3D, preview area 310 may include two or more tabs 350 (shown in FIGS. 3A-3D as tabs 350-A, 350-B, and 350-C). Each of the tabs 350 may be associated with previewing a different type of interface. For example, as shown in FIGS. 3A and 3B, preview area 310 may include a first tab 350-A that presents a preview of documents (e.g., web pages) presented when flow 140 is executed.

In the context of providing support to a customer regarding a STB, first tab 350-A may provide web pages that guide the customer through steps related to servicing the STB. For example, text 322-A-1 and images 324-A-1 in the web pages may instruct the customer to perform certain actions to determine a status of the STB and/or to reset the STB.

FIGS. 3C and 3D show sample views 320-B-1 and 320-B-2 that present multimedia 326 (shown as multimedia 326-B-1 in FIG. 3C and as multimedia 326-B-2 in FIG. 3D) when tab 350-B is selected. As shown in FIG. 3C, sample view 320-B-1 may correspond to object 120-A-1 and may be presented when slider handle 340 is moved to a corresponding position on slider bar 330. As shown in FIG. 3D, when slider handle 340 is moved to a different position on slider bar 330, preview area 310 may present a different sample view 320-B-2 associated with another object (object 120-A-3 in FIG. 3D). Thus, a user may move slider handle 340 (or submit another input) to navigate through sample views 320 for objects 120 associated with presenting different types of data.

In the context of providing support to a customer regarding a STB, second tab 350-B may provide multimedia content (e.g., automated audio messages) that guide the customer through steps related to servicing the STB. For example, sample view 320-B-1 may instruct the customer to perform certain actions to determine a status of the STB, and sample view 320-B-2 may instruct the customer to perform certain actions to reset the STB (e.g., based on the status determined based on sample view 320-B-1).

Thus, when generating the particular flow 140, a flow designer may preview information provided to the customer or technician through any of the different interface (e.g., using tabs 350 in preview interface 300) to verify that the information is correct. For example, the flow designer may adjust a position of slider handle 340 on slider bar 330 to preview different information provided by each of the interfaces. Furthermore, information provided through each of the interfaces may be changed by one of the objects 120 in the particular flow 140, such as to modify the information provided to different functions associated with the interfaces, without having to modify code sections associated with other portions of the particular flow 140. For example, the flow designer may update outputs of the different interfaces to reflect a new good or service. The flow designer may use flow display area 130 to identify possible objects 120 related to the desired change, and the flow designer may use preview interface 300 to verify that the desired changes where accurately provided in all of the interfaces.

It should be appreciated, however, that preview interface 300 in FIGS. 3A-3D is provided merely for purpose of simplicity and the illustrated configuration of preview interface 300 in FIGS. 3A-3D is provided for explanatory purposes only. In practice, preview interface 300 may include additional, fewer, or different elements than illustrated in FIGS. 3A-3D. For example, in one implementation, preview interface 300 may include an area (not shown) that receives an input from a user and identifies a sample view 320 associated with the input. For example, the user may identify particular text, and preview interface may identify an object 120 associated with a sample view that includes the particular text.

FIG. 4 illustrates an exemplary debug interface 400 that may be provided in accordance with one implementation. As shown in FIG. 4, debug interface 400 may include flow display area 130 that presents flow 140 (flow 140-A in FIG. 4) and a debug area 410 that presents information that a user may use to debug code associated with a selected object 120 (shown as object 120-A-2 in FIG. 4) when forming flow 140. Debug area 410 may include, for example, an input variable definition area 420 to accept an input from the user to define, format, identify, etc. a variable to be provided to the corresponding object 120. For example, a user may use input variable definition area 420 to specify a specific value for the input variable.

In one implementation, debug interface may further identify (e.g., in flow display area 130) objects 120 that have be successfully compiled and/or executed and which objects 120 have failed during compilation and/or execution.

Continuing with FIG. 4, debug area 410 may include a debug sample view 430 and an output variables preview area 440. Debug sample view 430 may present a sample output (e.g., text 432 and images 434) that are generated by a corresponding object 120 based on input variables specified in input variable definition area 420. Alternatively or in addition, output variables preview area 440 may present an output variable that is generated by the corresponding object 120 based on input variables specified in input variable definition area 420.

It should be appreciated, however, that debug interface 400 in FIG. 4 is provided merely for purpose of simplicity and the illustrated configuration of debug interface 400 in FIG. 4 is provided for explanatory purposes only. In practice, debug interface 400 may include additional, fewer, or different elements than illustrated in FIG. 4. For example, debug interface 400 may include a code editing section (not shown) that enables a user to edit code associated with an object when debug sample view 430 and/or output variables preview area 440 do not present desired information. For example, debug interface 400 may automatically present the code editing section when an error occurs when executing associated code using the defined input variable(s).

Figure 5:
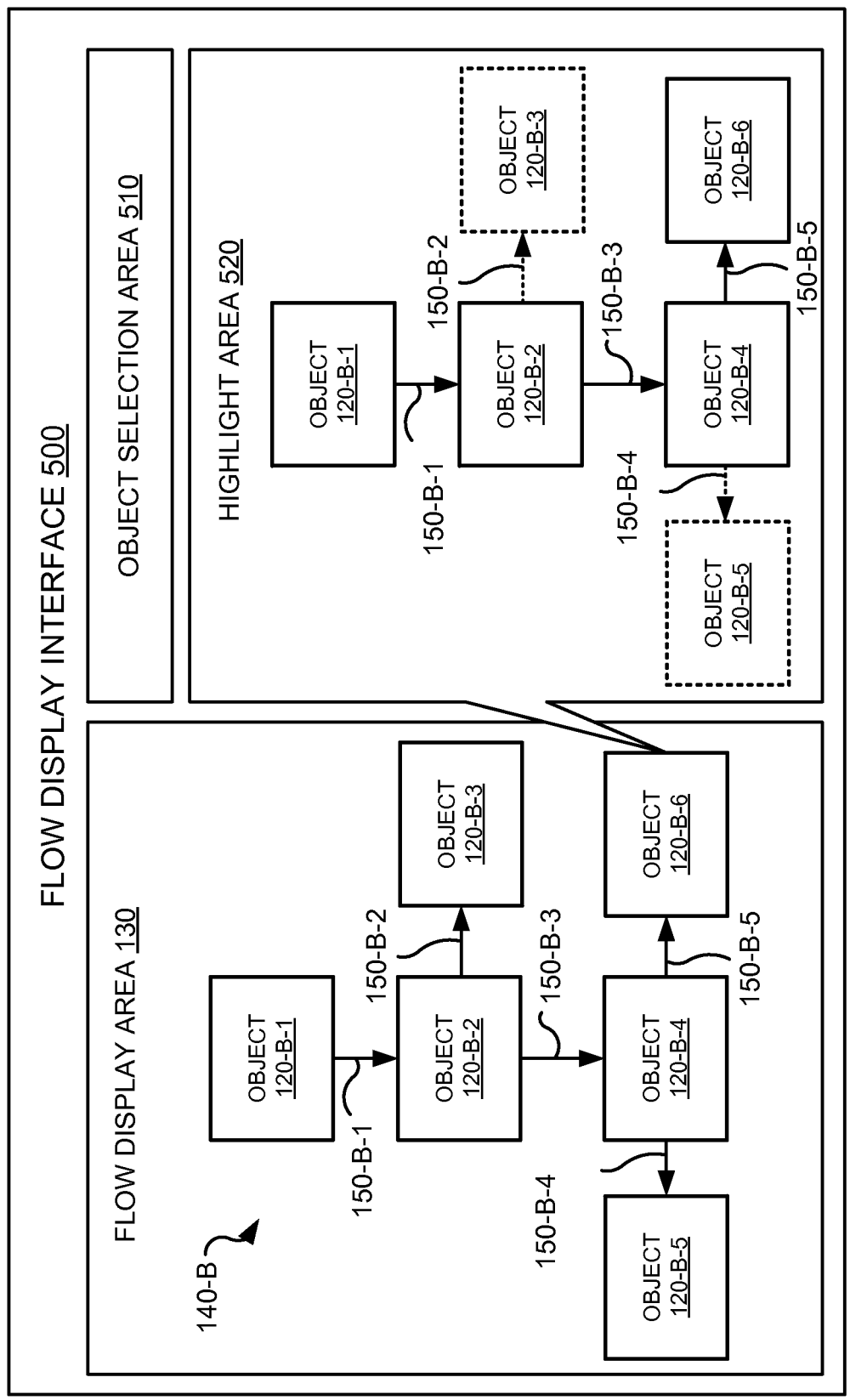
FIG. 5 shows an exemplary interface for highlighting particular graphical objects associated with a portion of the flow generated using the interface shown in FIG. 1.

FIG. 5 illustrates an exemplary flow display interface 500 that may be provided in accordance with one implementation. As shown in FIG. 5, flow display interface 500 may include flow display area 130 that presents flow 140 (flow 140-B in FIG. 5) and an object selection area 510 that enables a user to select an object 120 (shown as object 120-B-6 in FIG. 5) and a highlight area 520 that identifies a path (i.e., a series of objects 120 and connections 150) in a flow 140 that leads to the selected object 120. The path identifies objects associated with code that is executed before code associated with the selected object 120.

Object selection area 510 may include, for example, one or more fields (not shown in FIG. 5) to receive an input identifying one of objects 120 included in flow 140. For example, an input received in object selection area 510 may specify one or more object characteristics (e.g., a shape, location, associated connections 150, etc.), and the desired object 120 may be identified based on the one or more object characteristics. In another example, object selection area 510 may receive an input identifying one or more characteristics associated with data (e.g., data type, identifier, format, etc.), and flow display interface 500 may identify an object 120 inputting and/or outputting data that conforms to the one or more identified data characteristics.

In another implementation, an object 120 in flow 140 is selected without using object selection area 510. For example, a user may submit an input in flow display area selecting one of objects 120 in flow 140. In another example, an object 120 associated with faulty code (e.g., code producing an error when executed or compiled) may be automatically selected.

As shown in FIG. 5, highlight area 520 may graphically identify (e.g., using a graphical symbol) the selected object 120 (object 120-B-6). In another example, the selected object 120 may be displayed in flow display interface 500 using a different color, intensity, brightness, font, size, transparency, etc., in comparison to other elements in flow 140.

Continuing with FIG. 5, highlight area 520 may highlight elements in flow 140 that lead to (e.g., are performed to process or generate data provided to) the selected object 120. For example, highlight area 520 may present the highlighted elements in a visually distinguishing manner, such as presenting the relevant elements in a different color, intensity, brightness, font, size, transparency, etc., in comparison to other elements in flow 140. In the exemplary flow 140-B shown in FIG. 5, when object 120-B-6 is selected, objects 120-B-1, 120-B-2, and 120-B-4 and connections 150-B-1, 150-B-3, and 150-B-5 that lead to selected object 120-B-6 are highlighted (e.g., shown in solid lines in FIG. 5). Other elements in flow 140-B that do not lead to object 120-B-6 (i.e., objects 120-B-3 and 120-B-5 and connections 150-B-2 and 150-B-4) are not highlighted (e.g., shown in dashed lines in FIG. 5).

In this way, a user may determine a set of objects 120 (and the associated series of functions/code sections) that are implemented to arrive at the selected object 120. For example, if the objects 120 relate to presenting data, the user may identify data that is presented before the selected object 120 (e.g., data associated with objects 120-B-1, 120-B-2, and 120-B-4 in FIG. 5) and data that is not presented (e.g., data associated with objects 120-B-3 and 120-B-5 in FIG. 5) before the selected object 120-B-6.

It should be appreciated, however, that flow display interface 500 in FIG. 5 is provided merely for purpose of simplicity and the illustrated configuration of flow display interface 500 in FIG. 5 is provided for explanatory purposes only. In practice, flow display interface 500 may include additional, fewer, or different elements than illustrated in FIG. 5.

Figure 6A:
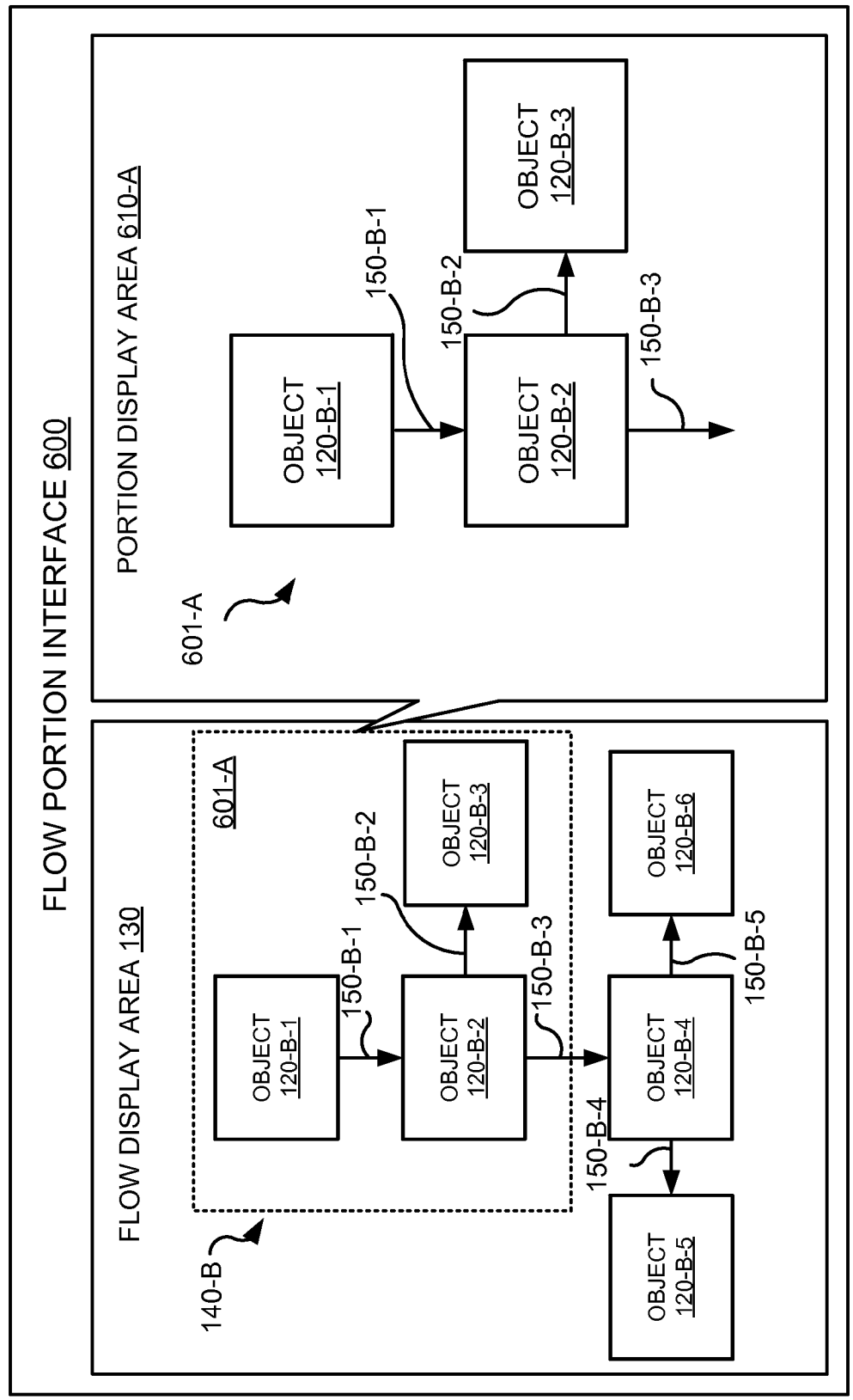
FIGS. 6A and 6B show an interface for viewing different portions of the flow generated using the interface shown in FIG. 1.
Figure 6B:
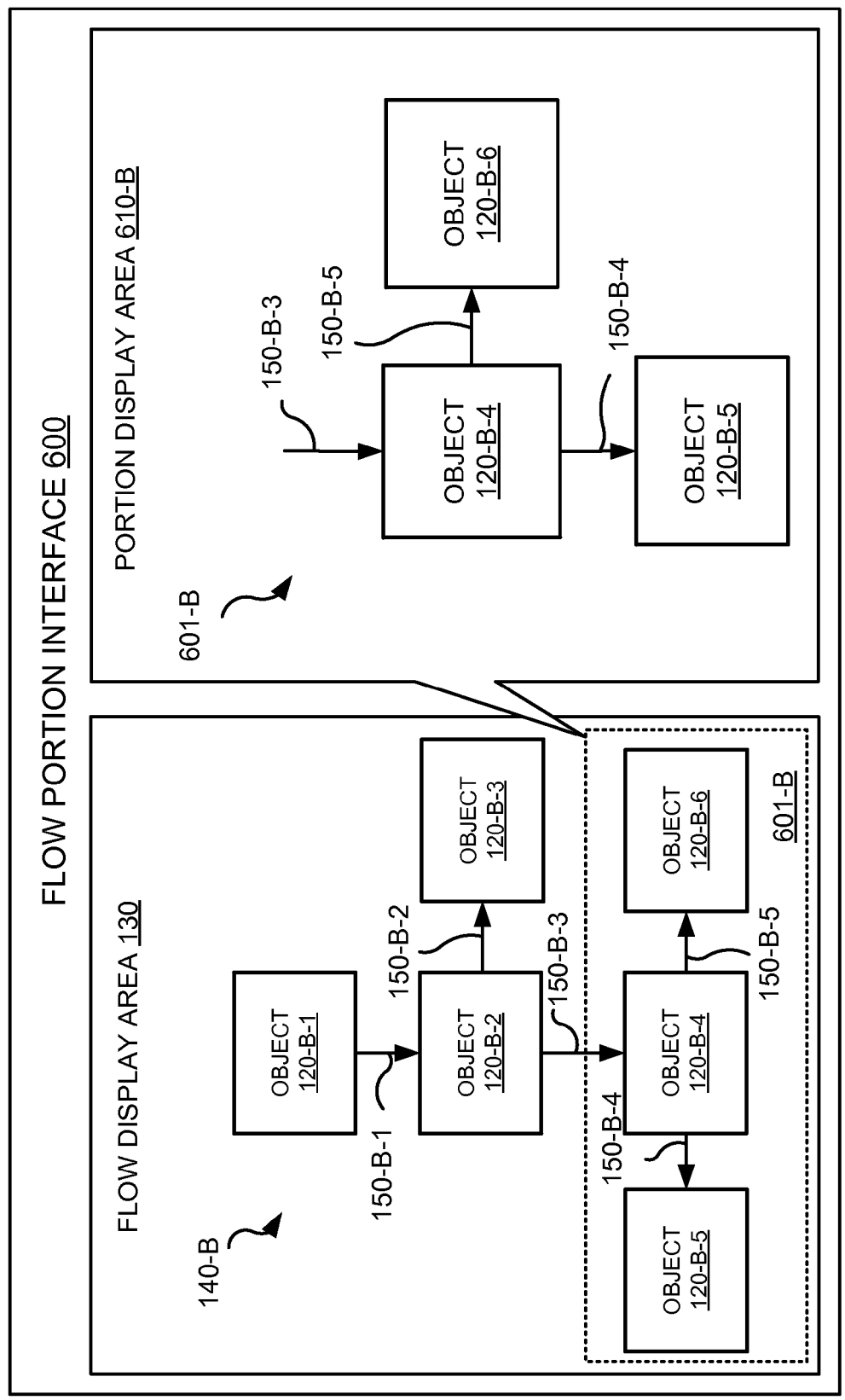

FIGS. 6A and 6B illustrate an exemplary flow portion interface 600 that may be provided in accordance with one implementation. Flow portion interface 600 may include flow display area 130 that presents flow 140 (shown as flow 140-B in FIGS. 6A and 6B) and a portion display area 610 (shown as portion display area 610-A in FIG. 6A and portion display area 610-B in FIG. 6B) that presents a portion 601 (shown as portion 601-A in FIG. 6A and portion 601-B in FIG. 6B) of flow 140. Splitting a complex flow 140 (e.g., a flow 140 that includes multiple objects 120 and/or connectors 150) may make it easier for a designed to manage the complex flow 140.

When presenting portion 601, portion display area 610 may presents objects 120 and connections 150 included in the portion 601. Portion display area 610 may modify a displayed appearance of objects 120 and connections 150 included in the portion 601 as desired. For example, as shown in FIGS. 6A and 6B, portion display area 610 may enlarge the displayed appearance of objects 120 and connections 150 in portion 601 to improve the visibility of these elements. In addition or alternatively, as shown in FIG. 6B, portion display area 610 may alter the displayed position of an object 120 and/or connection 150 in portion 601 (object 120-B-5 in FIG. 6B). For example, portion display area 610 may alter the displayed position of an object 120 based on a logical rule, such as to maintain a desired graphical distance between objects 120, visually group objects 120 associated with similar functions or handling similar types of data, etc.

Flow display area 130 may present certain information, such as textual identifiers, associated with objects 120 and connections 150. Portion display area 610 may display the identifiers and other additional information. For example, portion display area 610 may present information identifying an associated function, a status of the code (e.g., whether the code is compiled, debugged, executed, etc.), a responsible party, etc.

Portion 601 may be selected based on a user input. For example, in flow portion interface 600, a user may submit an input to select one or more objects 120, presented in flow display area 130, to include in portion 601. In one implementation, objects 120 may be selected for portion 601 based on one or more logical rules. For example, a particular quantity of objects 120 from flow 140 may be included in portion 601. In another example, a portion 601 may include objects 120 in flow 140 that are associated with similar data and/or functions.

It should be appreciated, however, that flow portion interface 600 in FIGS. 6A and 6B is provided merely for purpose of simplicity and the illustrated configuration of flow portion interface 600 in FIGS. 6A and 6B is provided for explanatory purposes only. In practice, flow portion interface 600 may include additional, fewer, or different elements than illustrated in FIGS. 6A and 6B. For example, flow portion interface 600 may include an area (not shown) for receiving a user input specifying one or more criteria for selecting objects 120 to include in portion 601.

FIG. 7 is a diagram of an exemplary environment 700 in which systems and/or methods described herein may be implemented. As shown in FIG. 7, environment 700 may include, for example, a flow design device 710, a network 720, a function device 730, a programmer device 740, a storage device 750, and a user device 760.

Flow design device 710 may include a computing device to present one or more of flow creation interface 100, function interface 200, preview interface 300, debug interface 400, flow display interface 500, flow portion interface 600, etc. and to receive one of more user inputs related to defining, modifying, and/or using flow 140.

Network 720 may include one or more wired and/or wireless networks that are capable of exchanging information related to flow 140 (e.g., code associated with objects 120 in flow 140, data exchanged between devices during execution of the code, etc.). For example, network 720 may include one or more public switched telephone networks (PSTNs) or another type of switched network. Additionally or alternatively, network 720 may further include one or more packet switched networks, such as an Internet protocol (IP) based network, a local area network (LAN), a wide area network (WAN), a personal area network (PAN), an intranet, the Internet, or another type of network that is capable of exchanging information. For example, network 720 may include a private packet-switched network, a cable television network (e.g., a hybrid fiber-coax network), a wireless broadcast network (e.g., a satellite media broadcasting network or terrestrial broadcasting network), a telephone network, a provider-specific network (e.g., a Verizon® FIOS® network), an optical fiber network, or any other suitable network. Network 720 may also include a number of transmission towers for receiving wireless signals and forwarding the signals toward the intended destination.

Function device 730 may include a computing device, such as an application server, that stores, provides, and/or executes code associated with function. For example, flow design device 710 may interact with function device 730 via network 720 to determine functions 220 identified in available function area 210. During execution of flow 140, a call may be made to function device 730 to access an associated function 220, such as to execute code associated with the function 220.

Programmer device 740 may include a computing device to generate code associated with an object 120. For example, flow design device 710 may interact with programmer device 740 may via network 720 to request (e.g., via function creation area 230) generation of code that is not available from function device 730, to request generation of code (e.g., an API) to access a function through function device 730, and/or modification of code associated with a function provided by function device 730.

In one implementation, a notification may be automatically sent to programmer device 740 (e.g., from flow design device 710), when a portion of flow 140 is modified.

Storage device 750 may include one or more memory devices or network devices that gather, process, store and/or provide information described herein. For example, storage device 750 more store information identifying particular objects 120 included in a flow 140 and functions 220 associated with the objects 120. In one implementation, storage device 750 may store code associated with the particular objects. When the code associated with flow 140 is executed, storage device 750 may also store beginning, intermediate, and final data values used within the code. Storage device 750 may be a part of flow design device 710, or may be a separate device separate from flow design device 710.

User device 760 may be a computing device to obtain and execute code associated with flow 140 (e.g., compiled code stored by storage device 750). User device 760 may execute the compiled code to present a particular type of data, such as web pages.

The quantity of devices and/or networks, illustrated in FIG. 7, is provided for explanatory purposes only. In practice, environment 700 may include additional devices and/or networks, fewer devices and/or networks, different devices and/or or networks, or differently arranged devices and/or networks than illustrated in FIG. 7. Also, in some implementations, one or more of the devices of environment 700 may perform one or more functions described as being performed by another one or more of the devices of environment 700. Devices of environment 700 may interconnect via wired connections, wireless connections, or a combination of wired and wireless connections.

FIG. 8 is a diagram illustrating exemplary components of a device 800. Device 800 may correspond, for example, to one or more components included in environment 700 (e.g., flow design device 710, a component of network 720, function device 730, programmer device 740, storage device 750, or user device 760). Alternatively or additionally, a component of environment 700 may include one or more computing devices 800 and/or one or more components of device 800. As shown in FIG. 8, device 800 may include a bus 810, a processing unit 820, a memory 830, an input component 840, an output component 850, and a communication interface 860.

Bus 810 may include a path that permits communication among the components of device 800. Processing unit 820 may include a processor, a microprocessor, or processing logic that may interpret and execute instructions. Memory 830 may include any type of dynamic storage device that may store information and instructions, for execution by processing unit 820, and/or any type of non-volatile storage device that may store information for use by processing unit 820.

Input component 840 may include a mechanism that permits a user to input information to device 800, such as a keyboard, a keypad, a button, a switch, etc. Output component 850 may include a mechanism that outputs information to the user, such as a display, a speaker, one or more light emitting diodes (LEDs), etc. Communication interface 860 may include any transceiver-like mechanism that enables device 800 to communicate with other devices and/or systems via wireless communications, wired communications, or a combination of wireless and wired communications. For example, communication interface 860 may include mechanisms for communicating with another device or system via a network. Alternatively or additionally, communication interface 860 may be a logical component that includes input and output ports, input and output systems, and/or other input and output components that facilitate the transmission of data to other devices.

Device 800 may perform certain operations in response to processing unit 820 executing software instructions contained in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions contained in memory 830 may cause processing unit 820 to perform processes described herein. Alternatively, hardwired circuitry may be used in place of or in combination with software instructions to implement processes described herein. Thus, implementations described herein are not limited to any specific combination of hardware circuitry and software.

Device 800 may include fewer components, additional components, different components, and/or differently arranged components than those illustrated in FIG. 8. For example, device 800 may include one or more switch fabrics instead of, or in addition to, bus 810. In another example, in some implementations, a display may not be included in device 800. In these situations, device 800 may be a "headless" device that does not include input component 840. Additionally, or alternatively, one or more operations described as being performed by a particular component of device 800 may be performed by one or more other components, in addition to or instead of the particular component of device 800.

FIG. 9 is a flow diagram illustrating an exemplary process 900 for forming a flow 140. In one implementation, process 900 may be performed by flow design device 710. In other implementations, process 900 may be performed by another device, such as by one or more other devices of environment 700.

As shown in FIG. 9, process 900 may include selecting a graphical object 120 (block 910). As described above with respect to FIG. 1, flow design device 710 may provide flow creation interface 100 to receive a user input to select a graphical object. For example, flow design device 710 may receive an input, in object selection area 110, selecting from objects 120 of different shapes. Flow design device 710 may further receive an input (e.g., in object definition area 160) specifying one or more characteristics to associate with the object 120. In another implementation, flow design device 710 may automatically select an object 120 based on one or more criteria. For example, the selected object 120 may be determined based on a desired function to associate with the object 120.

Continuing with FIG. 9, process 900 may include determining a function associated with the selected graphical object 120 (block 920). For example, as described above with respect to block 910, an object 120 may be selected based on an associated function. In another example, flow design device 710 may receive an input, in available function area 210, selecting from available functions 220 (e.g., functions available through function devices 730).

If the desired function is not available or a modification to an existing function is desired, flow design device 710 may receive an input, in function creation area 230, specifying desired characteristics for a function to associate with the selected object 120. Flow design device 710 may then forward a message to programmer device 740 requesting creation and/or modification of code associated with the desired function. For example, flow design device 710 may automatically forward a message to programmer device 740 associated with a person or entity identified in responsible party field 170-F, identified in object definition area 160. The message may request creation of code associated with the desired function, or the message may notify the identified person or entity that the code is being modified or generated.

Continuing with FIG. 9, process 900 may further include determining a connection between the selected graphical object 120 and another graphical object 120 (block 930). For example, as described above with respect to FIG. 1, flow design device 710 may receive an input, in flow creation interface 100 identifying a connection 150 between two objects 120. In addition or alternatively, flow design device 710 may receive an input, in flow creation interface 100 identifying graphical aspects of the objects 120, such as relative sizes and/or positions of the objects 120.

Continuing with FIG. 9, process 900 may further include compiling and/or executing code associated with flow 140 (block 940). Compiling code associated with flow 140 may include, for example, organizing the code based on graphical features of flow 140. For example, in flow 140-A depicted in flow display area 130 in FIG. 1, a directional connections 150-A-1 associates object 120-A-1 and object 120-A-2 to indicate that a function associated with object 120-A-1 is performed before a function associated with object 120-A-2. Thus, data generated in connection with the function for object 120-A-2 may be provided to the function for object 120-A-2. The connection 150 or other feature of flow 140 (e.g., the relative position or other characteristics of the two objects 120) may identify, for example, an order in which code associated with the two objects 120 should be performed, and the code may be compiled based on this order.

While a series of blocks has been described with respect to FIG. 9, the order of the blocks in process 900 may be modified in other implementations. Furthermore, non-dependent blocks may be performed in parallel. Furthermore, process 900 may include additional and/or fewer blocks than shown in FIG. 9. For example, process 900 may further include storing code associated with flow 140 to storage device 750 and/or providing the compiled code to user device 760.

Various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a processor, information selecting a first graphical object and a second graphical object to include in a flow;
   determining, by the processor, first code associated with the first graphical object and second code associated with the second graphical object, wherein the first code and the second code relate to presenting a first type of digital content and a second type of digital content that differs from the first type of digital content;
   determining, by the processor, a graphical relationship between the first graphical object and the second graphical object, wherein the graphical relationship includes a connection between the first graphical object and the second graphical object;
   presenting, by the processor, the flow in a first area of a display;
   executing, by the processor, the first code and the second code, wherein executing the first code and the second code includes:
      determining, based on the graphical relationship, an order to perform the first code and the second code,
      determining, based on the graphical relationship, data exchanged between the first code and the second code, and
      executing the first code and the second code based on the order and the exchanged data;
   presenting, by the processor, a first graphical tab and a second graphical tab in a second area of the display;
   receiving, by the processor, a first input selecting one of the first tab or the second tab;
   presenting, by the processor and in the second area, one of the first type of digital content or the second type of digital content based on the first input, wherein the first type of digital content is presented when the first input relates to selecting the first tab and the second type of digital content is presented when the first input relates to selecting the second tab;
   receiving, by the processor, a second input modifying at least one of the first code, the second code, or the graphical relationship;
   determining, by the processor and based on the second input, a change to the first type of digital content and a change to the second type of digital content;
   receiving, by the processor, a third input selecting one of the first tab or the second tab; and
   modifying, by the processor, the second area of the display to present the change to the first type of digital content when the third input relates to selecting the first tab, or the change to the second type of digital content when the third input relates to selecting the second tab.

2. The method of claim 1, further comprising:
   receiving information identifying sample data for the first code;
   executing the first code based on the sample data to generate debugging results; and
   presenting the debugging results for display.

3. The method of claim 1, wherein determining the first code includes:
   presenting, for display, information identifying functions, wherein each of the functions is associated with stored code;
   receiving an input selecting one of the functions; and
   generating the first code based on the stored code associated with the selected function.

4. The method of claim 3, wherein generating the first code includes:
   using an application programming interface (API) to exchange data between the stored code associated with the selected function and the second code associated with the second graphical object.

5. The method of claim 3, further comprising:
   determining a shape associated with the first graphical object; and
   selecting the functions, from a plurality of functions, based on the shape.

6. The method of claim 1, wherein the flow includes a plurality of graphical objects, and wherein the method further comprises:
   receiving data identifying a particular graphical object of the plurality of graphical objects; and
   presenting for display, based on receiving the data identifying the particular graphical object, information identifying graphical objects, from the plurality of graphical objects, that are associated with code that is executed to produce an input for code associated with the particular graphical object.

7. The method of claim 1, further comprising:
   receiving data identifying a portion of the flow; and
   presenting, for display in a third area of the display, information identifying graphical objects included in the portion of the flow.

8. The method of claim 1, wherein presenting, in the second area, the one of the first type of digital content or the second type of digital content based on the first input, further includes:

presenting a graphical slider bar and a graphical slider handle;

receiving a fourth input, wherein the fourth input relates to selecting a position of the graphical slider handle with respect to the graphical slider bar;

presenting one of a first portion of the first digital content or a second portion of the first digital content based on the position of the graphical slider handle when the first input relates to selecting the first tab; and presenting one of a first portion of the second digital content or a second portion of the second digital content based on the position of the graphical slider handle when the first input relates to selecting the first tab.

9. A device comprising:

a memory; and a processor configured to:

receive information identifying a first graphical object and a second graphical object to include in a flow, determine first code associated with the first graphical object and second code associated with the second graphical object, wherein the first code relates to presenting a first type of digital content, and the second code relates to presenting a second type of digital content that differs from the first type of digital content, determine a graphical relationship between the first graphical object and the second graphical object, wherein the graphical relationship includes a connection between the first graphical object and the second graphical object, present the flow in a first area of a display, determine, based on the graphical relationship, an order to perform the first code and the second code and data exchanged between the first code and the second code, execute the first code and the second code based on the order and the exchanged data, present a first graphical tab and a second graphical tab in a second area of the display, receive a first input selecting one of the first tab or the second tab, present, in the second area, one of the first type of digital content or the second type of digital content based on the first input, wherein the first type of digital content is presented when the first input relates to selecting the first tab and the second type of digital content is presented when the first input relates to selecting the second tab, receive a second input modifying at least one of the first code, the second code, or the graphical relationship, determine, based on the second input, a change to the first type of digital content and a change to the second type of digital content, receive a third input selecting one of the first tab or the second tab, and modify the second area of the display to present:

the change to the first type of digital content when the third input relates to selecting the first tab, or the change to the second type of digital content when the third input relates to selecting the second tab.

10. The device of claim 9, wherein the processor is further configured to:

receive information identifying sample data for the first code, execute the first code based on the sample data to generate debugging results, and present the debugging results for display.

11. The device of claim 9, wherein the processor, when determining the first code, is further configured to:

present, for display, information identifying functions, wherein each of the functions is associated with stored code, receive data selecting one of the functions, and generate the first code based on the stored code associated with the selected function.

12. The device of claim 11, wherein the processor, when generating the first code, is further configured to:

determine a responsible party associated with the first graphical object, determine a desired change to the stored code associated with the selected function, and forward a notification to the responsible party regarding the desired change.

13. The device of claim 9, wherein the processor, when presenting, in the second area, the one of the first type of digital content or the second type of digital content based on the first input, is further configured to:

present a graphical slider bar and a graphical slider handle, receive a fourth input, wherein the fourth input relates to selecting a position of the graphical slider handle with respect to the graphical slider bar, present one of a first portion of the first digital content or a second portion of the first digital content based on the position of the graphical slider handle when the first input relates to selecting the first tab, and present one of a first portion of the second digital content or a second portion of the second digital content based on the position of the graphical slider handle when the first input relates to selecting the first tab.

14. The device of claim 9, wherein the flow includes a plurality of graphical objects, and wherein the processor is further configured to:

receive data identifying a particular graphical object of the plurality of graphical objects, and present for display, based on receiving data identifying the particular graphical object, information identifying graphical objects, from the plurality of graphical objects, that are associated with code sections that are executed to produce an input for a code section associated with the particular graphical object.

15. A non-transitory computer-readable medium to store instructions, the stored instructions comprising:

one or more instructions that, when executed by a processor, cause the processor to:

receive information identifying a first graphical object and a second graphical object to include in a flow, determine first code associated with the first graphical object and second code associated with the second graphical object, wherein the first code relates to presenting a first type of digital content, and the second code relates to presenting a second type of digital content that differs from the first type of digital content, determine a graphical relationship between the first graphical object and the second graphical object, wherein the graphical relationship includes a connection between the first graphical object and the second graphical object, present the flow in a first area of a display, determine, based on the graphical relationship, an order to perform the first code and the second code and data exchanged between the first code and the second code, execute the first code and the second code based on the order and the exchanged data, present a first graphical tab and a second graphical tab in a second area of the display, receive a first input selecting one of the first tab or the second tab, present, in the second area, one of the first type of digital content or the second type of digital content based on the first input, wherein the first type of digital content is presented when the first input relates to selecting the first tab and the second type of digital content is presented when the first input relates to selecting the second tab, receive a second input modifying at least one of the first code, the second code, or the graphical relationship, determine, based on the second input, a change to the first type of digital content and a change to the second type of digital content, receive a third input selecting one of the first tab or the second tab, and modify the second area of the display to present the change to the first type of digital content when the third input relates to selecting the first tab, or the change to the second type of digital content when the third input relates to selecting the second tab.

16. The non-transitory computer-readable medium of claim 15, wherein the stored instructions further comprise:
one or more instructions that, when executed by the processor, cause the processor to:
receive information identifying sample data for the first code,
execute the first code based on the sample data to generate debugging results, and
present the debugging results for display.

17. The non-transitory computer-readable medium of claim 15, wherein the stored instructions further comprise:
one or more instructions that, when executed by the processor, cause the processor to:
determine a responsible party associated with at least one of the first code or the second code, and
send a notification to the responsible party regarding re-executing the first code and the second code.

18. The non-transitory computer-readable medium of claim 15, wherein the one or more instructions, when causing the processor to determine the first code, further cause the processor to:
present, for display, information identifying functions, wherein each of the functions is associated with stored code,
receive data selecting one of the functions, and
generate the first code based on the stored code associated with the selected function.

19. The non-transitory computer-readable medium of claim 15, wherein the one or more instructions, when causing the processor to present, in the second area, the one of the first type of digital content or the second type of digital content based on the first input, further cause the processor to:
present a graphical slider bar and a graphical slider handle,
receive a fourth input, wherein the fourth input relates to selecting a position of the graphical slider handle with respect to the graphical slider bar,
present one of a first portion of the first digital content or a second portion of the first digital content based on the position of the graphical slider handle when the first input relates to selecting the first tab, and
present one of a first portion of the second digital content or a second portion of the second digital content based on the position of the graphical slider handle when the first input relates to selecting the first tab.

20. The non-transitory computer-readable medium of claim 15, wherein the first type of digital content include at least one of text or images, and wherein second type of digital content includes multimedia content.

* * * * *